United States Patent
Sishtla et al.

(10) Patent No.: US 12,216,202 B2
(45) Date of Patent: Feb. 4, 2025

(54) OPTIMIZED ANTENNA SCAN STRATEGY FOR WINDSHEAR DETECTION

(71) Applicant: Rockwell Collins, Inc., Cedar Rapids, IA (US)

(72) Inventors: Venkata A. Sishtla, Cedar Rapids, IA (US); Jacob G. Teague, West Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 378 days.

(21) Appl. No.: 17/577,815

(22) Filed: Jan. 18, 2022

(65) Prior Publication Data

US 2023/0228872 A1   Jul. 20, 2023

(51) Int. Cl.
*G01S 13/95* (2006.01)
*H01Q 3/08* (2006.01)

(52) U.S. Cl.
CPC ............ *G01S 13/953* (2013.01); *H01Q 3/08* (2013.01)

(58) Field of Classification Search
CPC .......... G01S 13/953; G01S 7/414; H01Q 3/08
See application file for complete search history.

(56) References Cited

U.S. PATENT DOCUMENTS

| | | | |
|---|---|---|---|
| 4,649,388 A | 3/1987 | Atlas | |
| 4,940,987 A | 7/1990 | Frederick | |
| 6,388,608 B1 | 5/2002 | Woodell et al. | |
| 6,456,226 B1 | 9/2002 | Zheng et al. | |
| 8,134,491 B1 | 3/2012 | Meyer et al. | |
| 9,116,244 B1 | 8/2015 | West et al. | |
| 9,658,328 B1 | 5/2017 | Sperling et al. | |
| 10,605,912 B1 | 3/2020 | Godfrey et al. | |
| 10,754,020 B2 | 8/2020 | Holt et al. | |
| 10,809,375 B1 * | 10/2020 | Dana ..................... | G01S 13/953 |
| 11,143,756 B2 | 10/2021 | Vacanti | |

(Continued)

FOREIGN PATENT DOCUMENTS

CN          201788280 U      4/2011

OTHER PUBLICATIONS

Weber Mark E., The Next-Generation Multimission U.S. Surveillance Radar Network, Published online: Nov. 1, 2007 Print Publication: Nov. 1, 2007 DOI: https://doi.org/10.1175/BAMS-88-11-1739 pp. 1739-1752.

(Continued)

*Primary Examiner* — Timothy X Pham
(74) *Attorney, Agent, or Firm* — Suiter Swantz IP

(57) ABSTRACT

A weather radar system initiates a horizontal scan at a first tilt angle, then adjusts the tilt angle down during an intermediate phase of the horizontal scan, and finally adjust the tilt angle back to the first tilt angle for an end phase of the horizontal scan. The intermediate phase may comprise a fifteen-to-twenty-degree arc centered about a centerline of the weather radar antenna. The radar system may perform test horizontal scans at intervals within a predefined range, each having a different fixed tilt angle to identify tilt angles having desirable signal-to-noise ratio and signal-to-clutter ratio at different phases of the scan. Alternatively, the system may execute a vertical scan and at one or more horizontal positions to identify desirable tilt angles at various phases.

14 Claims, 4 Drawing Sheets

(56) References Cited

U.S. PATENT DOCUMENTS

2004/0239550 A1* 12/2004 Daly, Jr. ............... G01S 13/953
           342/26 B
2015/0138992 A1* 5/2015 Jover ..................... H04K 3/224
           370/244

OTHER PUBLICATIONS

Extended European Search Report dated Jun. 13, 2023; European Application No. 23151326.8.

* cited by examiner

OPTIMIZED ANTENNA SCAN STRATEGY FOR WINDSHEAR DETECTION

BACKGROUND

Microburst detection is critical for autonomous operation; however, detecting microbursts with weather radar is challenging due to the presence of strong ground clutter. Antenna tilt directly affects the signal-to-noise ratio (SNR). Lower antenna tilts can improve the SNR but decrease the signal-to-clutter ratio (SCR) causing false alerts whereas higher antenna tilts will increase SCR but decrease SNR causing missed detects.

SUMMARY

In one aspect, embodiments of the inventive concepts disclosed herein are directed to a weather radar system that initiates a horizontal scan at a first tilt angle, then adjusts the tilt angle down during an intermediate phase of the horizontal scan, and finally adjust the tilt angle back to the first tilt angle for an end phase of the horizontal scan. The intermediate phase may comprise a fifteen-to-twenty-degree arc centered about a centerline of the weather radar antenna.

In a further aspect, the radar system may perform test horizontal scans at intervals within a predefined range, each having a different fixed tilt angle to identify tilt angles having desirable SNR and SCR at different phases of the scan. Alternatively, the system may execute a vertical scan and at one or more horizontal positions to identify desirable tilt angles at various phases.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
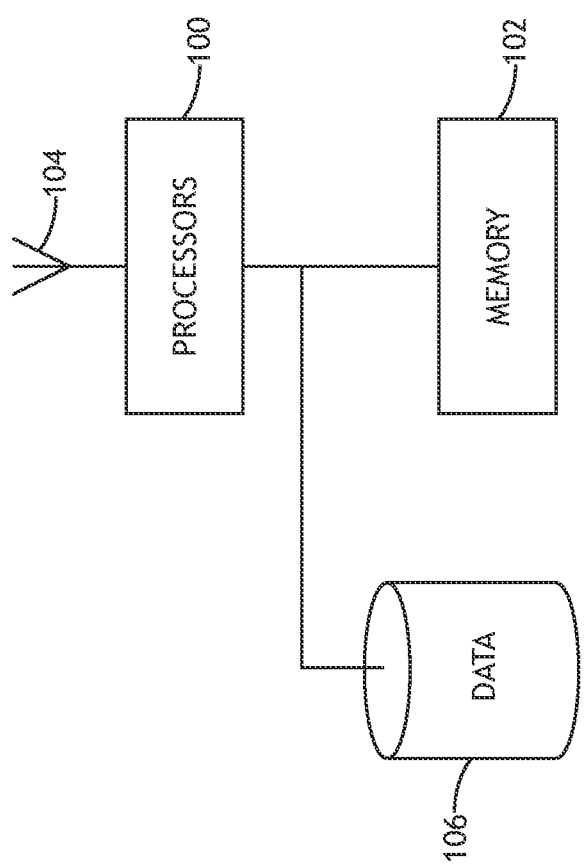
FIG. 1 shows a block diagram of a system according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a weather radar system that initiates a horizontal scan at a first tilt angle (up or down), then adjusts the tilt angle down during an intermediate phase of the horizontal scan, and finally adjust the tilt angle back to the first tilt angle for and end phase of the horizontal scan. The intermediate phase may comprise a fifteen-to-twenty-degree ark centered about a centerline of the weather radar antenna.

Referring to FIG. 1, a block diagram of a system according to an exemplary embodiment is shown. The system includes a processor 100, memory 102 connected to the processor 100 for embodying processor executable code, and an antenna 104 for generating a weather radar signal and receiving a return signal. In at least one embodiment, the antenna 104 comprises a mechanically tiltable antenna. In another embodiment, the antenna 104 comprises an electronically scanned array (ESA).

In at least one embodiment, the processor 100 adjusts the antenna 104 to a first tilt angle, then initiates a horizontal scan. During the horizontal scan, the processor 100 adjusts the antenna 104 to a second tilt angle during an intermediate phase and continues the horizontal scan. The processor 100 may then re-adjust the antenna 104 to the first tilt angle and continue for the rest of the horizontal scan. Alternatively, the processor 100 may adjust the tilt angle of the antenna 104 across the entire horizontal scan range, either dynamically for entire range, or to distinct angles for various portions of the scan.

In at least one embodiment, elevation may be associated with scan angle (left to right) and such associations stored in a data storage element 106. Because SCR is highly correlated with reflected ground signals, certain tilt angles may be correlated with altitude. The processor 100 may select tilt angles based on associations stored in the data storage element 106, correlating altitude to SNR and SCR, or other factors know from avionics systems aboard a corresponding aircraft.

Figure 2:
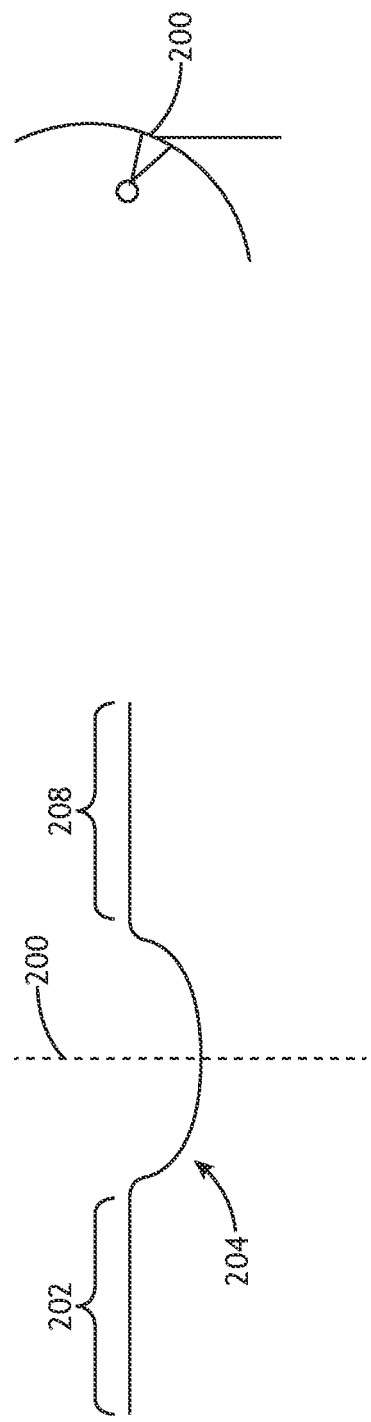
FIG. 2 shows a block diagram of a horizontal scan according to an exemplary embodiment.

Referring to FIG. 2, a block diagram of a horizontal scan according to an exemplary embodiment is shown. During a horizontal scan, an antenna 200 is set to a first tilt angle during an initial scan phase 202. The initial scan phase 202 generally corresponds to a peripheral view of the radar (that is to say, some region to the side of an aircraft) and the first tilt angle is determined based on SNR and SCR with a bias toward a higher tilt angle to avoid ground clutter, and thereby reduce false alerts.

During an intermediate scan phase 204, generally corresponding to a view in front of the radar (that is to say, the region in front of the aircraft), the antenna 200 is set to a second tilt angle lower than the first tilt angle. A lower tilt angle during the intermediate scan phase 204 produces a better SNR for the region in front of the aircraft where microburst detection is most critical. Furthermore, signals directly in front of the aircraft may be more easily discriminated than signals at the periphery of the radar view region, especially as doppler shift is a major mechanism for identifying microbursts. Beam broadening causes the clutter spectrum to widen towards the ends of scan resulting in lower clutter suppression when using a doppler-based filter.

At the edges of the scan, predictive windshear functionality relies heavily on Doppler shift, so the spectrum from ground, which is a function of scan angle and beam width, gets wide. A wider spectrum is harder to reject because it is a function of cosine of the scan angle. Because the cosine of the scan angle in the middle is one, the best and narrowest clutter is in the middle of the scan. When the spectrum gets wide eliminating all ground clutter becomes difficult or impossible, leading to more false alerts because the radar may identify the ground as weather.

In at least one embodiment, the intermediate scan phase 204 may be centered about an axis 206 defined by the body of the aircraft. The intermediate scan phase 204 may extend between 15° and 20° from the axis 206.

During a final scan phase 208, the antenna 200 may be set to the first tilt angle or some third tilt angle distinct from the first or second. The selection of the tilt angle for the final scan phase 208 may be driven by desirable SNR and SCR for peripheral scans. In at least one embodiment, the initial scan phase 202 may utilize a tilt angle of about 5°, the intermediate scan phase 204 may utilize a tilt angle of about 3°, and the final scan phase 208 may utilize a tilt angle of about 5°

Figure 3:
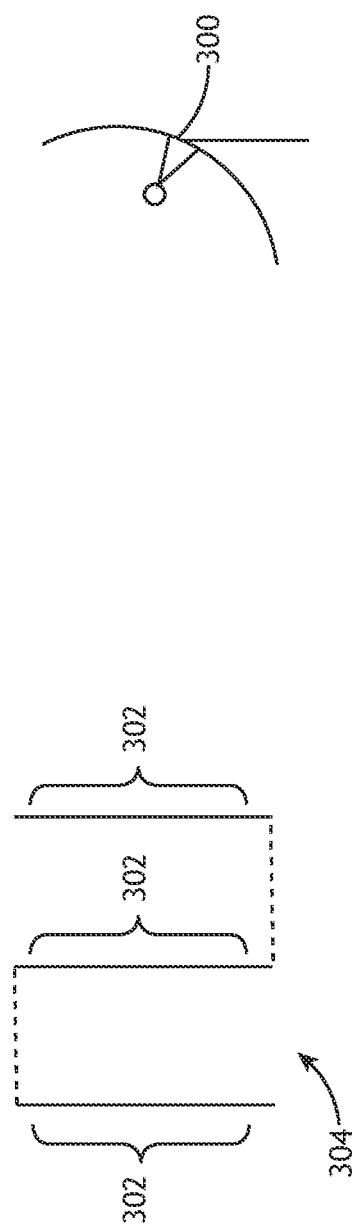
FIG. 3 shows a block diagram of a vertical scan according to an exemplary embodiment.

Referring to FIG. 3, a block diagram of a vertical scan according to an exemplary embodiment is shown. The radar system may perform one or more vertical scans and analyze SNR and SCR across the vertical scans where points along the vertical scans 302 correspond to different tilt angles. Based on the analysis, SNR is optimized by determining a tilt angle corresponding to the middle of a horizontal scan and SCR is optimized by returning the tilt angle at the ends of the horizontal scan.

In at least one embodiment, a series of vertical scans with a traditional antenna 300 may measure the outflow at various elevations. Tilt angles may be chosen to put the antenna at the peak outflow.

A quick vertical scan enables the radar system to compute the Doppler for predefined scan phases. In at least one embodiment, initials scans may be performed at intervals 304 such as 3°.

Figure 4:
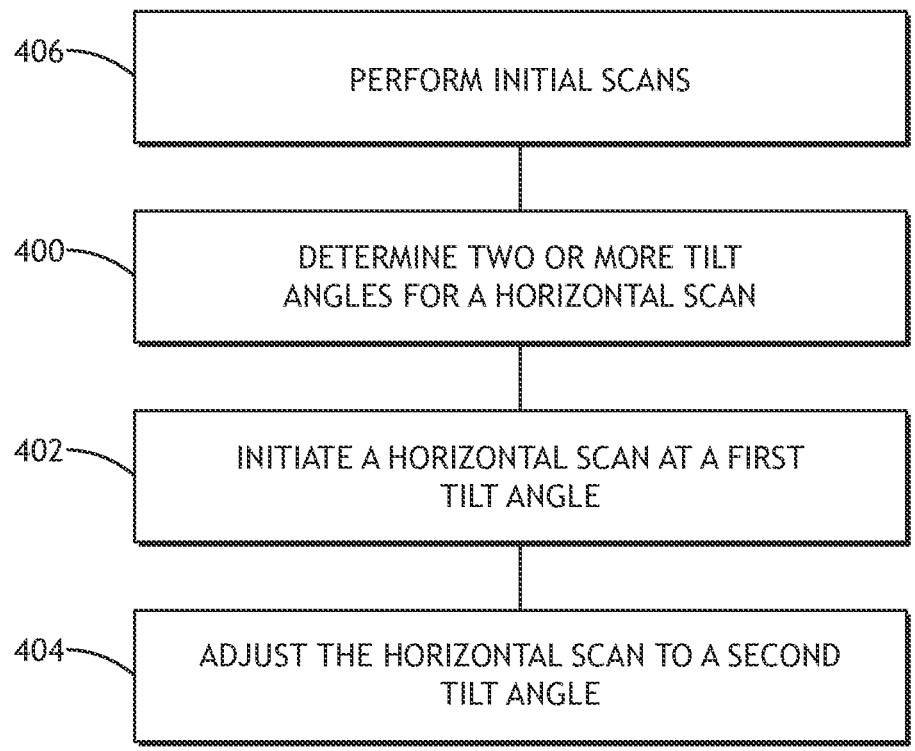
FIG. 4 shows a flowchart of a method according to an exemplary embodiment.

Referring to FIG. 4, a flowchart of a method according to an exemplary embodiment is shown. An aircraft radar system determines 400 two or more tilt angles for a horizontal scan to identify microbursts. A first tilt angle corresponds to a peripheral scan region while a second tilt angle corresponds to an intermediate, central scan region in front of the aircraft. The second tilt angle is lower than the first tilt angle and may encompass a region generally in front of the aircraft.

Once the first tilt angle and second tilt angle are determined 400, a radar antenna is set to the first tilt angle and a horizontal scan is initiated 402. As the radar system performs the horizontal scan, at some point the antenna reaches an intermediate portion of the scan which may be between 15° to 20° from a centerline of the aircraft. At the intermediate portion, the antenna is adjusted 404 to the second tilt angle, and the horizontal portion continues for the intermediate portion.

In at least one embodiment, after scanning the intermediate portion, the antenna may be adjusted back to the first tilt angle, or some distinct third tilt angle higher than the second tilt angle. In at least one embodiment, where a microburst is located to the left of the aircraft, the radar system may point the antenna down in the left side based on the optimum outflow.

In at least one embodiment, the adjustment 404 from the first tilt angle to the second tilt angle may be continuous, with a smooth transition from the first tilt angle to the second tilt angle. Alternatively, where the antenna is electronically configurable, the transition from the first tilt angle to the second tilt angle may be substantially instantaneous.

In at least one embodiment, the radar system may perform 406 a series of initial scans to identify desirable tilt angle at various scan phases. In at least one embodiment, a series of horizontal scans may be performed and SNR and SCR analyzed for each scan. Tilt angles may then be chosen for each phase of a horizontal scan according to a balance between SNR and SCR at various horizontal points. Alternatively, one or more vertical scans may be performed 406 and SNR and SCR analyzed across the vertical scans where points along the vertical scans correspond to different tilt angles. SNR is optimized by dipping the antenna down in the middle and SCR is optimized by lifting the antenna up at the ends.

In at least one embodiment, a series of verticals with a traditional antenna, or quick horizontal scans in the intermediate region with an ESA may measure the outflow at various elevations. Tilt angles may be chosen to put the antenna at the peak outflow.

A quick vertical scan or a series of horizontal scans enables the radar system to compute the doppler for predefined scan phases. In at least one embodiment, initials scans may be performed 406 at intervals such as 4°.

Embodiments of the present disclosure mitigate the issues of identifying microbursts with weather radar. The antenna tilt is changed based on scan angle. The antenna can tilt higher at the end of the scan for reduced clutter and tilt lower in the middle of the scan where clutter suppression is easier. Clutter suppression is critical for situational awareness. Tilting the antenna up produces less echo from the ground at the sides and normal echo in the middle where the weather is actually most important to the flight crew.

Alternatively, or in addition, a weather radar system may identify a vertical velocity profile by performing a series of horizontal scans or vertical scans. This vertical velocity profile allows the radar system to point the antenna for optimized SNR by identifying the region of maximum outflow.

Accurately detecting microbursts is key to developing an ESA radar for autonomous operation. SNR is a key factor for accurate microburst detection. Adjusting the antenna tilt optimizes SNR which is essential for achieving full MOPS compliance. Embodiments of the present disclosure provide superior SNR and SCR during the entirety of a single horizontal scan.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   at least one processor in data communication with at least one antenna and a memory storing processor executable code for configuring the at least one processor to:
   perform two or more horizontal scans at constant tilt angles;
   determine signal-to-noise ratios of a return signal of each of the horizontal scans;
   determine the first tilt angle and second tilt angle based on the signal-to-noise ratios by determining corresponding sets of signal-to-noise ratios and signal-to-clutter ratios, and selecting the first tilt angle and second tilt angle based on a predefined threshold of signal-to-noise ratio and signal-to-clutter ratio;
   begin a horizontal scan with the antenna at a first tilt angle corresponding to a first peripheral view;
   adjust the antenna to a second tilt angle during an intermediate segment of the scan corresponding to a center view; and
   adjust the antenna to the first tilt angle during an end segment of the scan corresponding to a second peripheral view,
   wherein the first tilt angle is higher than the second tilt angle.

2. The computer apparatus of claim 1, wherein the at least one processor is further configured to:
   continuously determine a signal-to-noise ratio of a return signal;
   determine the first tilt angle and second tilt angle based on the signal-to-noise ratio.

3. The computer apparatus of claim 1, wherein the at least one processor is further configured to:
   perform one or more vertical scans;
   determine signal-to-noise ratios of a return signal of the vertical scan at various tilt angles;
   determine the first tilt angle and second tilt angle based on the signal-to-noise ratios.

4. The computer apparatus of claim 3, wherein the at least one processor is further configured to select the first tilt angle and second tilt angle based on a predefined threshold of signal-to-noise ratio and signal-to-clutter ratio.

5. The computer apparatus of claim 1, wherein the intermediate segment comprises a window of between fifteen and twenty degrees in front of an aircraft.

6. A method comprising:
   performing two or more horizontal scans at constant tilt angles;
   determining signal-to-noise ratios of a return signal of each of the horizontal scans;
   determining the first tilt angle and second tilt angle based on the signal-to-noise ratios by determining corresponding sets of signal-to-noise ratios and signal-to-clutter ratios, and selecting the first tilt angle and second tilt angle based on a predefined threshold of signal-to-noise ratio and signal-to-clutter ratio;
   beginning a horizontal scan with the antenna at a first tilt angle corresponding to a first peripheral view;
   adjusting the antenna to a second tilt angle during an intermediate segment of the scan corresponding to a center view; and
   adjusting the antenna to the first tilt angle during an end segment of the scan corresponding to a second peripheral view,
   wherein the first tilt angle is higher than the second tilt angle.

7. The method of claim 6, further comprising:
   continuously determining a signal-to-noise ratio of a return signal;
   determining the first tilt angle and second tilt angle based on the signal-to-noise ratio.

8. The method of claim 6, further comprising:
   performing one or more vertical scans;
   determining signal-to-noise ratios of a return signal of the vertical scan at various tilt angles;
   determining the first tilt angle and second tilt angle based on the signal-to-noise ratios.

9. The method of claim 8, further comprising selecting the first tilt angle and second tilt angle based on a predefined threshold of signal-to-noise ratio and signal-to-clutter ratio.

10. The method of claim 6, wherein the intermediate segment comprises a window of between fifteen and twenty degrees in front of an aircraft.

11. A radar system comprising:
    at least one antenna; and
    at least one processor in data communication with the at least one antenna and a memory storing processor executable code for configuring the at least one processor to:
    perform two or more horizontal scans at constant tilt angles;
    determine signal-to-noise ratios of a return signal of each of the horizontal scans;
    determine the first tilt angle and second tilt angle based on the signal-to-noise ratios by determining corresponding sets of signal-to-noise ratios and signal-to-clutter ratios, and selecting the first tilt angle and second tilt angle based on a predefined threshold of signal-to-noise ratio and signal-to-clutter ratio;

begin a horizontal scan with the antenna at a first tilt angle corresponding to a first peripheral view;

adjust the antenna to a second tilt angle during an intermediate segment of the scan corresponding to a center view; and adjust the antenna to a third tilt angle during an end segment of the scan corresponding to a second peripheral view, wherein the first tilt angle and third tilt angle are higher than the second tilt angle.

12. The system of claim 11, wherein the at least one processor is further configured to:

continuously determine a signal-to-noise ratio of a return signal;

determine the first tilt angle and second tilt angle based on the signal-to-noise ratio.

13. The system of claim 11, wherein the at least one processor is further configured to:

perform one or more vertical scans;

determine signal-to-noise ratios of a return signal of the vertical scan at various tilt angles;

determine the first tilt angle and second tilt angle based on the signal-to-noise ratios.

14. The system of claim 11, wherein the intermediate segment comprises a window of between fifteen and twenty degrees in front of an aircraft.

* * * * *